United States Patent
Dale et al.

(10) Patent No.: US 6,512,817 B1
(45) Date of Patent: Jan. 28, 2003

(54) METHOD AND APPARATUS FOR POLLING TELEPHONY LINE STATUS IN AN INTEGRATED SERVICES HUB TO REDUCE POWER CONSUMPTION

(75) Inventors: Allan D. Dale, Haslett, MI (US); Earl Goodrich, II, East Lansing, MI (US); Craig Lyle Mahaney, Milan, MI (US)

(73) Assignee: Sprint Communications Company, LP, Overland Park, KS (US)

( * ) Notice: Subject to any disclaimer, the term of this patent is extended or adjusted under 35 U.S.C. 154(b) by 24 days.

(21) Appl. No.: 09/653,105

(22) Filed: Aug. 31, 2000

(51) Int. Cl.[7] ................................................ H04M 3/22
(52) U.S. Cl. ..................... 379/9.05; 379/1.01; 379/2; 379/27.06; 379/32.01; 379/33
(58) Field of Search .......................... 379/15.01, 32.04, 379/33, 9.01, 27.06, 1.01, 2, 9.05, 32.01

(56) References Cited

U.S. PATENT DOCUMENTS

| | | | | |
|---|---|---|---|---|
| 5,017,799 A | * | 5/1991 | Fishman | ...................... 307/34 |
| 5,734,711 A | * | 3/1998 | Kleffner | |
| 5,881,142 A | | 3/1999 | Frankel et al. | ............... 379/167 |
| 5,963,620 A | | 10/1999 | Frankel et al. | ........... 379/93.05 |
| 6,075,784 A | | 6/2000 | Frankel et al. | ............... 370/356 |
| 6,141,339 A | | 10/2000 | Kaplan et al. | ............... 370/352 |
| 6,272,209 B1 | * | 8/2001 | Bridger et al. | |
| 6,351,534 B1 | * | 2/2002 | Phillips | ....................... 379/324 |

* cited by examiner

Primary Examiner—Curtis Kuntz
Assistant Examiner—Barry W Taylor
(74) Attorney, Agent, or Firm—Harley R. Ball; Steven J. Funk; Kevin D. Robb

(57) ABSTRACT

The present invention discloses a method for reducing battery power consumed by an integrated services hub supporting a plurality of telephone lines. The status of power to the integrated services hub is monitored, and upon detecting a failure of primary power, each of the telephone lines is polled to detect an off-hook condition. The status of power to the integrated services hub is monitored while polling, and the polling is stopped upon detecting a return of primary power to the integrated services hub or upon detecting an off-hook condition in one of the telephone lines. Polling is performed by placing one of the telephone lines in a standby state and the remaining telephone lines in a disabled state and monitoring the telephone line in standby state for a predetermined amount of time to detect an off-hook condition. After the predetermined amount of time has lapsed, the monitored telephone line is changed from standby state to disabled state, and the next of the plurality of telephone lines is placed in a standby state, while any remaining telephone lines remain a disabled state. This polling sequence is repeated during active polling.

8 Claims, 1 Drawing Sheet

US 6,512,817 B1

METHOD AND APPARATUS FOR POLLING TELEPHONY LINE STATUS IN AN INTEGRATED SERVICES HUB TO REDUCE POWER CONSUMPTION

BACKGROUND OF THE INVENTION

The present invention relates to an integrated services hub (ISH) for use with broadband packet networks, and more specifically it relates to a method and apparatus for polling the status of telephony lines connected to the ISH in order to minimize power consumption when the ISH is operating on battery backup power.

Traditionally, telephony communications within the United States were handled by the public switched telecommunications network (PSTN). The PSTN can be characterized as a network designed for voice communications, primarily on a circuit-switched basis, with full interconnection among individual networks. The PSTN network is largely analog at the local loop level, digital at the backbone level, and generally provisioned on a wireline, rather than a wireless, basis. The PSTN includes switches that route communications between end users. Circuit switches are the devices that establish connectivity between circuits through an internal switching matrix. Circuit switches set connections between circuits through the establishment of a talk path or transmission path. The connection and the associated bandwidth are provided temporarily, continuously, and exclusively for the duration of the session, or call. While developed to support voice communications, circuit switches can support any form of information transfer (e.g., data and video communications).

In a traditional PSTN environment, circuit switches include central office (CO) exchanges, tandem exchanges, access tandem exchanges, and international gateway facilities. Central offices, also known as exchanges, provide local access services to end users via local loop connections within a relatively small area of geography known as an exchange area. In other words, the CO provides the ability for a subscriber within that neighborhood to connect to another subscriber within that neighborhood. Central offices, also known as end offices, reside at the terminal ends of the network. In other words, COs are the first point of entry into the PSTN and the last point of exit. They are also known as class 5 offices, the lowest class in the switching hierarchy. A class 5 telephone switch communicates with an analog telephone using the analog telephony signals in the well-known analog format. The class 5 telephone switch provides power to the telephone; detects off-hook status of the telephone and provides a dial tone in response; detects dual-tone multi-frequency signals from the caller and initiates a call in the network; plays a ringback tone to the caller when the far-end telephone is ringing; plays a busy tone to the caller when the far-end telephone is busy; provides ring current to the telephone on incoming calls; and provides traditional telephone services such as call waiting, call forwarding, caller ID, etc.

In an effort to increase the amount and speed of information transmitted across networks, the telecommunications industry is shifting toward broadband packet networks which are designed to carry a variety of services such as voice, data, and video. For example, asynchronous transfer mode (ATM) networks have been developed to provide broadband transport switching capability between local area networks (LANs) and wide area networks (WANs). The Sprint ION network is a broadband network that is capable of delivering a variety of services such as voice, data, and video to an end user at a residential or business location. The Sprint ION network has a wide area IP/ATM or ATM backbone that is connected to a plurality of local loops via multiplexors. Each local loop carries ATM over ADSL (asymmetric digital subscriber line) traffic to a plurality of integrated service hubs (ISHs), which may be at either residential or business locations.

An ISH is a hardware component that links business or residential user devices such as telephones and computers to the broadband, wide area network through a plurality of user interfaces and at least one network interface. A suitable ISH is described in co-pending U.S. patent application Ser. No. 09/226,575 entitled "Multi-Services Communications Device," filed on Jan. 7, 1999 (Sprint docket number 1246), which is incorporated by reference herein in its entirety. The network interface typically is a broadband network interface such as ADSL, T1, or HDSL-2. Examples of user interfaces include telephone interfaces such as plain old telephone system (POTS) ports for connecting telephones, fax machines, modems, and the like to the ISH; computer interfaces such as ethernet ports for connecting computers and local area networks to the ISH; and video ports such as RCA jacks for connecting video players, recorders, monitors, and the like to the ISH.

In providing telephony services over a broadband network, the ISH connects a telephone in the customer's premises to a network element such as a service manager. This connection between the telephone and the network element is typically an ATM connection, which is much different than the traditional analog line to the local switch. ATM connections usually do not support analog telephony signals, such as off-hook, dial tone, and busy signals. Therefore, the ISH must provide many of the telephony functions traditionally provided by the telephone provider central office such as detect off-hook conditions, on-hook connections, and digits as well as provide the telephones with dial tone, ring current, ringback, and busy signals. The terms off-hook and off-hook condition as used herein are generic terms meaning that a user device (whether telephone, facsimile machine, modem, etc.) connected to a telephone line is attempting to access and use the line.

Another example of such a central office function being provided by the ISH is backup power. Traditionally in cases of power grid failure, the central office provides backup power to customers' telephones through use of an industrial-strength, petroleum-fueled backup generator. Since it is not economical to equip each customer with a backup generator, an ISH must be equipped with an back-up power supply, which is typically a battery pack, to maintain power to the system in cases of power grid failure. The use of telephony services impacts how long the batteries can keep the ISH operational because more power is required to maintain phone lines in active (i.e., conversational) state as opposed to standby (i.e., on-hook) or disabled states. Likewise, the number of telephone interfaces impacts battery life, as the amount of power used by the ISH increases with the number of telephone interfaces being served. The present invention addresses the need to preserve battery power by maintaining the supported telephone interfaces in a disabled state and only periodically and sequentially powering-up the supported telephone interfaces to a standby state to check whether there is a need to enable full power and service (i.e., active state) to a given interface.

SUMMARY OF THE INVENTION

The present invention discloses a method for reducing battery power consumed by an integrated services hub supporting a plurality of telephone lines, comprising monitoring the status of power to the integrated services hub; upon detecting a failure of primary power, polling each of the telephone lines to detect an off-hook condition; monitoring the status of power to the integrated services hub while polling; and stopping polling upon detecting a return of primary power to the integrated services hub or upon detecting an off-hook condition in one of the telephone lines. The step of polling each of the telephone lines to detect an off-hook condition further comprises placing one of the telephone lines in a standby state and the remaining telephone lines in a disabled state, monitoring the telephone line in standby state for a predetermined amount of time to detect an off-hook condition; after the predetermined amount of time has lapsed, changing the monitored telephone line from standby state to disabled state, placing the next of the plurality of telephone lines in a standby state, and maintaining any remaining telephone lines in a disabled state; and repeating this sequence.

The present invention further discloses an apparatus for reducing battery power consumed by an integrated services hub supporting a plurality of telephone lines, comprising at least one subscriber line interface circuit (SLIC), the SLIC having the ability to be placed in a disabled state, a standby state, and an active state and each of the telephone lines being connected to a SLIC; at least one component to detect an off-hook condition in the telephone lines connected to the SLIC; a power monitor for monitoring the status of power to the integrated services hub; and a polling controller, the polling controller receiving notification from the power monitor regarding the status of power to the integrated services hub, the polling controller receiving notification from the component to detect an off-hook condition regarding the condition of the telephone lines, and the polling controller altering the state of the SLIC in response to the notifications from the power monitor and the component to detect an off-hook condition. Preferably, the component to detect an off-hook condition in the telephone lines is a subscriber line access circuit (SLAC).

DETAILED DESCRIPTION OF THE INVENTION

Figure 1:
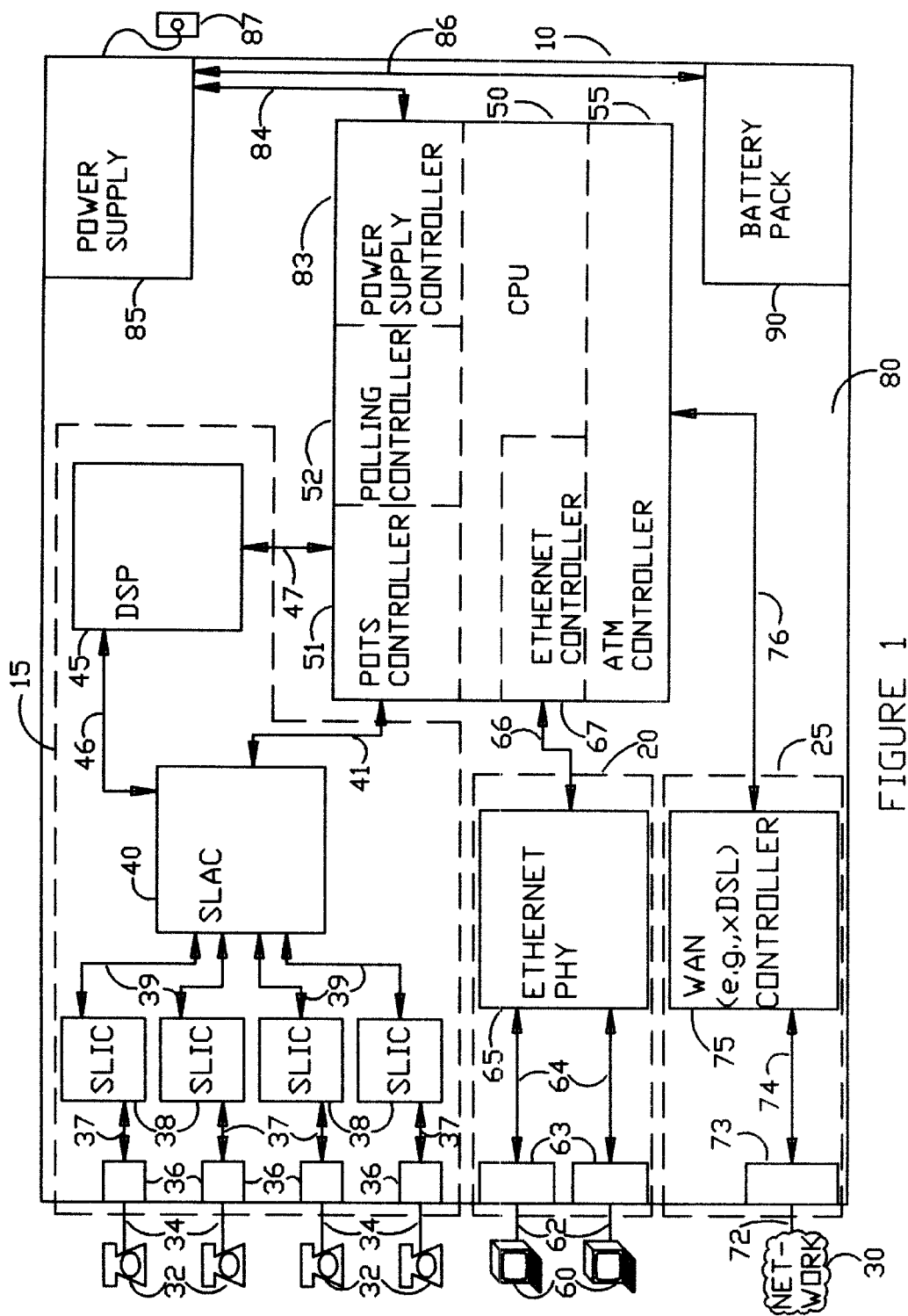
FIG. 1 is a block diagram of an integrated services hub (ISH) useful in carrying out the invention.

Referring to FIG. 1, integrated services hub (ISH) 10 comprises plain old telephone system (POTS) interface 15, local area network (LAN) interface 20, and wide area network (WAN) interface 25. POTS interface 15 and LAN interface 20 provide user interfaces for the ISH. WAN interface 25 provides the ISH with an interface to a wide area network 30, preferably a broadband packet network such as Sprint's ION network. In describing the ISH, the components are generally described in carrying out the appropriate function to transmit data from the user interfaces to the WAN, and it should be understood that these components in general perform the reverse function when receiving data from the WAN and transmitting it to the user interfaces.

Telephones 32 are connected by telephone lines 34 to POTS interface 15 by telephone jacks 36, for example industry standard RJ-11 jacks. While four telephones are shown in FIG. 1, any desirable number of telephones may be employed provided that the equipment is appropriately sized to accommodate that number. Telephones 32 are conventional communications devices that typically use the analog telephony format, and similar devices may be substituted such as facsimile machines or modems. Digital format telephones could also be used, with the understanding that the specific circuitry involved would change while providing equivalent functions (for example, detecting hook transitions). Telephone lines 34 are any medium operational to carry telephony signals, and are typically twisted pairs of copper wires.

In addition to telephone jacks 36, POTS interface 15 further comprises subscriber line interface circuits (SLICs) 38, subscriber line access circuit (SLAC) 40, and digital signal processor (DSP) 45. SLICs 38 are connected to telephone jacks 36 by connections 37 on a one-to-one basis. In other words, each telephone connected to the ISH by a telephone jack has a separate and corresponding SLIC. Alternatively, SLICs may incorporate more than one channel each, that is to say a SLIC may be connected to more than one telephone line. The SLICs convert relatively high power, two-line analog signals (also referred to as a tip and ring phone circuit) received from the telephone into relatively low power, four-line analog signals (also referred to as a transmit signal circuit and a receive signal circuit). Furthermore, the SLIC serves as the amplifier that drives power (i.e., voltage and current) onto its corresponding telephone line. Examples of suitable SLICs are integrated circuit chip numbers AM79R79 and AM79R241 produced by Advanced Micro Devices (AMD), Inc.

SLAC 40 is connected to SLICs 38 by connections 39. Generally, a SLAC performs three functions: line supervision, signal filtering and manipulation, and analog/digital conversions. The SLAC supervises the lines (and the SLIC corresponding to each line), which includes execution of various protocols for detecting and recognizing an off-hook condition. While a preferred embodiment shown in FIG. 1 uses a SLAC to perform line supervision, SLICs are available that perform line supervision functions, and such enhanced SLICs having integral hook transition monitoring capability could be used in carrying out the invention. Signal filtering and manipulation is used to conform signals to various industrial or regional/national telephony standards. The SLAC converts four-line analog signals received from the SLICs into four-line digital signals. Thus, the SLAC is an analog to digital (A/D) and digital to analog (D/A) converter, which is also referred to respectively as coding and decoding (i.e., a CODEC). Preferably, the SLAC codes and decodes in compliance with the International Telecommunications Union (ITU) G.711 standard. Typically, a SLAC manages a fixed number of SLICs, and thus the number of SLACs is determined by the number of SLICs. Examples of suitable SLACs are integrated circuit chip numbers AM79Q021 and AM79Q2243 produced by Advanced Micro Devices (AMD), Inc., which are quad-devices designed to manage four SLICs.

SLAC 40 transmits and receives control data such as line status and signaling to the central processing unit (CPU) 50 by connection 41. The CPU controls the overall function of the ISH and has initialization, management, configuration, and control responsibilities for all of the components and interfaces comprising the ISH. CPU 50 contains control software, which is stored in memory (for example, flash memory), and the control software is executed by the CPU. Upon execution of the control software, the CPU interacts with various peripherals (for example, WAN interface 25) through memory mapped peripherals having register spaces corresponding to address and data lines. The CPU control software include a) a POTS control module 51 that controls the telephony functions during operation of the ISH under primary power; b) a polling control module 52 that controls the POTS telephony functions when primary power fails; c) a power supply control module 83 which monitors, either continuously or periodically, the power supply; and d) ATM control module 55 that controls the communications with the network. An example of a suitable CPU is integrated circuit chip number MPC8260 Power QUICC II Communications Processor produced by Motorola, Inc.

Digital signal processor (DSP) 45 compresses (i.e., packetizes) data, typically voice data, received from SLAC 40 by connection 46. DSP 45 transmits compressed data to CPU 50 via connection 47 for transmission to network 30 by ATM control module 55. An example of a suitable DSP is integrated circuit chip number TMS320VC5402 produced by Texas Instruments, Inc. ATM control module 55 provides the ATM and AAL (ATM adaptation layer) layers of the ATM Protocol, which are necessary for ATM-formatted communications with network 30. In a preferred embodiment, ATM control module 55 is a software module on CPU 50.

Computers 60 are connected by connections 62 to LAN interface 20 by LAN connectors 63. LAN connectors 63 are preferably RJ-45 jacks, but any suitable computer connection means may be employed, for example a universal serial bus (USB). While two computers are shown in FIG. 1, any desirable number of computers may be employed provided that the equipment is appropriately sized to accommodate that number.

LAN interface 20 further comprises a LAN physical layer (PHY) device 65 connected to LAN connectors 63 by connections 64. LAN PHY device 65 is preferably an ethernet PHY, and more specifically a MII transceiver. CPU 50 contains an ethernet control module 67, which serves as a media access control (MAC) device and is connected to LAN PHY device 65 by connection 66. The ethernet PHY and MAC devices support a 10/100 Mbit industry standard MII ethernet connection.

Network 30 is connected by connection 72 to WAN interface 25 by WAN connector 73. WAN connector 73 is preferably a RJ-11 jack for ADSL. WAN interface 25 is preferably a universal, xDSL interface, and more preferably an ATM over ADSL interface. xDSL is a generic term encompassing all known varieties of digital subscriber lines (DSL) such as ADSL, U-ADSL, SDSL, HDSL2, RADSL, etc. Other types of WAN interfaces could be used such as T1, cable modem, wireless broadband modem, or ATM-25.

WAN interface 25 further comprises WAN controller 75 connected to WAN connector 73 by connection 74. WAN controller 75 is connected to ATM control module 55 by connection 76. WAN controller 75 is preferably Globespan's G707X multimode chip set, which further comprises an analog front end (AFE) chip (Globespan GS7070) and a multimode xDSL downloadable DSP and framer chip (Globespan GT3180). The AFE chip provides analog to digital and digital to analog signal conversions. The DSP and framer chip provides digital signal processing and signal transmission framing functions.

POTS interface 15, LAN interface 20, WAN interface 25, CPU 50, and ATM controller 55 are mounted on motherboard 80, which is a printed circuit board (also referred to as a logic board) that provides the various connections between ISH components as discussed above. The motherboard may include expansion slots to accept expansion cards such as an additional POTS card, an ATM-25 interface, a cable modem, etc. Motherboard 80 is connected to power supply 85 and battery pack 90, thereby providing power to the ISH components, the attached analog telephones, and the battery monitoring and charge circuitry. CPU 50 contains a power supply control module 83 connected to power supply 85 by connection 84. A preferred power supply is a universal-input (40–400 Hz, 90–270V AC RMS) switchmode lead/acid battery float charger with a current-limited output of nominally 13.8 V, and provides charging current to battery pack 90 as represented by connection 86. A preferred battery is a 12 volt DC, 2AH gel cell (lead-acid) battery, and preferably battery pack 90 comprises two such batteries housed within the ISH.

The power supply is plugged into a standard electrical outlet 87 and serves as the primary power source for the ISH. In the event of a power failure to the electrical outlet, the ISH operates under backup power provided by its battery pack and basic telephone services remain available to the customer for emergency calls. Given that the ISH requires power in order to provide basic telephone service, it is important to reduce power consumption, and thereby extend battery life as long as possible.

In a preferred embodiment of the ISH described above, POTS interface 15 provides a customer with four separate telephone lines. Each telephone line consumes an amount of power determined by its state (also referred to as mode), and each SLIC 38 controls the state of its corresponding telephone line 34. The least amount of power is consumed when a SLIC (and its corresponding telephone line) is in a disabled state, wherein the SLIC (i.e., amplifier) that drives power onto the line is shut down. In other words, the disabled state refers to the line being off or dead and the circuitry supporting that line drawing the least amount of power compared to all other possible modes. In disabled state, no line supervision is possible, and thus hook transitions (i.e., on-hook, off-hook, etc.) cannot be detected. More power is consumed when a SLIC (and its corresponding telephone line) is in a standby state, wherein the SLIC is turned on and a small about of current and voltage is driven to the line so that hook transitions can be detected. The most power is consumed when a telephone line is in active mode, wherein the SLIC is turned on, the telephone connected to the line is off-hook, and a greater amount of current and voltage is driven to the line to power the telephone. The state of each SLIC is controlled by an internal register residing within the SLAC, and this internal register is programmed through software residing on the CPU. While FIG. 1 shows a control path to the SLICs as routed though SLAC 40, it should be understood that the CPU optionally can be configured to communicate directly with the SLICs.

Under normal operating conditions with power supplied by the primary power source, all telephone lines are maintained in standby state, and the SLAC is simultaneously monitoring all lines so that hook transitions can be detected when a customer attempts to place a call. In order to minimize power consumption when operating under battery backup power, it would be advantageous to maintain the telephone lines in disabled state (rather than standby state). The problem, however, is that hook-transitions cannot be detected with the lines in disabled state, and thus the lines would remain disabled when a customer lifted the receiver from the telephone to place a call. The present invention solves this problem by polling the lines to detect hook transitions.

In a preferred embodiment shown in FIG. 1, POTS interface 15 comprises four telephone lines corresponding to four SLICs. In polling the group of four SLICs, a first SLIC is placed in standby state, and the remaining SLICs are placed in disabled state. While in standby state, the first SLIC can detect off-hook conditions, and thus can determine whether a customer has lifted the telephone receiver to place a call. If no off-hook condition is detected within a monitoring interval, the first SLIC is placed in disabled state, a second SLIC is changed from disabled state to standby state, and the remaining SLICs remain in disabled state. A monitoring interval is a predetermined amount of time in which a SLIC is placed in standby mode and monitored for off-hook conditions. For simplicity, the same monitoring interval preferably is used for all SLICs, provided however that each SLIC could have a different monitoring interval where desirable. If no off-hook condition is detected within a monitoring interval, the second SLIC is placed in disabled state, and a third SLIC is changed from disabled state to standby state, and the remaining SLICs remain in disabled state. If no off-hook condition is detected within a monitoring interval, the third SLIC is placed in disabled state, and a fourth SLIC is changed from disabled state to standby state, and the remaining SLICs remain in disabled state. If no off-hook condition is detected within a monitoring interval, the fourth SLIC is placed in disabled state, and the first SLIC is changed from disabled state to standby state, and the remaining SLICs remain in disabled state. This polling sequence continues until primary power returns or until a SLIC in standby state detects an off-hook condition, at which time the SLIC is placed in active state and the customer can place a call. In a preferred embodiment, the remaining SLICs stay in disabled state until the call is completed, at which time polling resumes, provided that primary power has not returned. Limiting the ISH to one active line during battery backup operation helps maximize power savings and increase battery life, while ensuring that at least one line is available for emergency use. Alternatively, polling could continue in the remaining lines after a first line has been placed in active state, and subsequently additional lines could be placed in active state as off-hook conditions are detected, with the understanding that power savings decrease as the number of lines placed in active mode increases.

In a preferred embodiment, SLICs are placed in standby mode and polled one at a time in order to maximize power savings and increase battery life. Alternatively, SLICs could be placed in standby mode and polled more than one at a time, with the understanding that power savings decrease as the number of lines placed in standby mode increases. For example, the polling mechanism consumes power, and polling more than one SLIC at a time likely will result in a surge demand on the battery, which is detrimental to extending battery life. A preferred embodiment is to poll each line sequentially to achieve a level load upon the battery. Power savings provided by the invention can be calculated as follows:

D=power consumed by a telephone line in disabled mode
S=power consumed by a telephone line in standby mode
N=number of telephone lines
Power consumed under normal conditions=Pnorm=N*S
Power consumed under battery condition=Pbatt=(N−1)*D+S
Power consumed by polling mechanism=Ppoll
Power savings from invention=Pnorm−Pbatt−Ppoll The polling interval represents the approximate maximum amount of time a customer may have to wait to receive a dial tone when lifting the telephone receiver during a primary power failure condition. For example, if a customer lifts the telephone receiver corresponding to the first SLIC at the end of the monitoring interval for the first SLIC, the customer will have to wait until the second, third, and fourth SLICs are polled and monitored before the first SLIC is again placed in standby mode and the off-hook condition detected. The polling interval is equal to (Q−1) multiplied by the monitoring interval, where Q represents the total number of SLICs (i.e., telephone lines) being polled and where each SLIC has the same monitoring interval. In general, increasing the monitoring interval (and thus the polling interval) favorably impacts power savings and battery life by decreasing the power expended to change SLIC modes. However, increasing the monitoring interval (and thus the polling interval) unfavorably impacts customer service by increasing the amount of time a customer may have to wait in order to receive a dial tone. Thus, a balance should be struck between the power savings associated with a longer polling interval and the adverse impact on customer service. For an ISH supporting four telephone lines, a preferred monitoring interval is less than or equal to about 0.33 second, which corresponds to a maximum customer wait time (i.e., polling interval) of less than about 1.0 second. An alternative solution to balancing power savings with a longer polling interval is to divide the total number of phones supported by the ISH into groups (also referred to as channel banks), and to implement polling within each group. For example, eight phones connected to the ISH could be broken into two groups of four, and polling initiated within each group of four phones upon a failure of primary power. While the total power required to poll two groups of four phones is greater than the power required to poll one group of four phones, polling in two groups of four still provides a power savings over maintaining all eight lines in standby state.

Power supply control module 83 provides regular reports to CPU 50 as to whether the ISH is operating on primary or battery backup power. If the ISH is operating on primary power, normal telephony functions are provided in accordance with the POTS control module 51. Upon receiving notification of a primary power failure, the CPU initiates polling by invoking the polling control module, which is closely related to or a subset of the POTS control module. The polling control module controls items such as initiation of polling, cessation of polling, the monitoring interval, the monitoring sequence, the SLIC modes, etc. During polling, the CPU continues to monitor the power supply and halts polling upon detecting the return of primary power.

Polling is initiated by the CPU setting the SLIC registers to the appropriate state. For example, the CPU would place the first SLIC in standby state and place the remaining SLICs in disabled state (thereby limiting the SLAC's ability to detect off-hook conditions to only the first SLIC). While in standby state, the SLAC monitors the first SLIC for off-hook condition and reports back to the CPU if an off-hook is detected. Alternatively, the SLIC itself may monitor for an off-hook condition and report back to the CPU if an off-hook condition is detected. If an off-hook condition is not detected, polling continues as described previously. If an off-hook condition is detected, the CPU places the first SLIC in active state, maintains the remaining SLICs in disabled state, and provides the necessary POTS telephony functions to process the call.

What is claimed is:

1. A method for reducing battery power consumed by an integrated services hub supporting a plurality of telephone lines, comprising:

(a) monitoring the status of power to the integrated services hub;

(b) upon detecting a failure of primary power, polling each of the telephone lines to detect an off-hook condition;

(c) monitoring the status of power to the integrated services hub while polling; and (d) stopping polling upon detecting a return of primary power to the integrated services hub or upon detecting an off-hook condition in one of the telephone lines.

2. The method of claim 1 wherein the step of polling each of the telephone lines to detect an off-hook condition further comprises:

(b)(1) placing one of the telephone lines in a standby state and the remaining telephone lines in a disabled state, (b)(2) monitoring the telephone line in standby state for a predetermined amount of time to detect an off-hook condition;

(b)(3) after the predetermined amount of time has lapsed, changing the telephone line monitored in step (b)(2) from standby state to disabled state, placing the next of the plurality of telephone lines in a standby state, and maintaining any remaining telephone lines in a disabled state; and (b)(4) continuing steps (b)(2) and (b)(3).

3. The method of claim 2 wherein the predetermined amount of time is equal to about one second divided by one less than the total number of telephone lines.

4. The method of claim 2 wherein a telephone line in disabled state requires less power than a telephone line in standby state.

5. An apparatus for reducing battery power consumed by an integrated services hub supporting a plurality of telephone lines, comprising:

(a) at least one subscriber line interface circuit (SLIC), the SLIC having the ability to be placed in a disabled state, a standby state, and an active state and each of the telephone lines being connected to a SLIC;

(b) at least one component to detect an off-hook condition in the telephone lines connected to the SLIC;

(c) a power monitor for monitoring the status of power to the integrated services hub; and (d) a polling controller, the polling controller receiving notification from the power monitor regarding the status of power to the integrated services hub, the polling controller receiving notification from the component to detect an off-hook condition regarding the condition of the telephone lines, and the polling controller altering the state of the SLIC in response to the notifications from the power monitor and the component to detect an off-hook condition.

6. The apparatus of claim 5 wherein the component to detect an off-hook condition in the telephone lines is a subscriber line access circuit (SLAC).

7. The apparatus of claim 5 wherein the component to detect an off-hook condition in the telephone lines is integral to the SLIC.

8. The apparatus of claim 5 wherein the number of SLICs equals the number of telephone lines, with a separate SLIC corresponding with and connected to each of the telephone lines.

* * * * *